United States Patent
De Meulenaere et al.

(10) Patent No.: US 7,400,631 B2
(45) Date of Patent: Jul. 15, 2008

(54) SCHEDULING UNIT WITH OPTIMIZED JITTER AND QUEUE OCCUPANCY

(75) Inventors: Paul Gilbert Regina De Meulenaere, Edegem (BE); Pascal Albert Emile Lefebvre, Brussels (BE)

(73) Assignee: ALCATEL, Paris (FR)

( * ) Notice: Subject to any disclaimer, the term of this patent is extended or adjusted under 35 U.S.C. 154(b) by 949 days.

(21) Appl. No.: 10/859,955

(22) Filed: Jun. 4, 2004

(65) Prior Publication Data

US 2004/0246970 A1    Dec. 9, 2004

(30) Foreign Application Priority Data

Jun. 6, 2003    (EP)    ................... 03291374

(51) Int. Cl.
*H04L 12/56*    (2006.01)
*H04L 12/43*    (2006.01)

(52) U.S. Cl. ................... 370/395.41; 370/459; 370/461

(58) Field of Classification Search ........................ None
See application file for complete search history.

(56) References Cited

U.S. PATENT DOCUMENTS

| | | | |
|---|---|---|---|
| 6,205,118 B1 * | 3/2001 | Rathnavelu | ................... 370/229 |
| 6,359,891 B1 * | 3/2002 | Bergantino et al. | ......... 370/398 |
| 6,392,994 B1 * | 5/2002 | Dubuc | ........................ 370/230 |
| 6,973,052 B2 * | 12/2005 | Wang et al. | .................. 370/278 |
| 7,023,865 B2 * | 4/2006 | Matsuoka et al. | ........... 370/412 |

2003/0007494 A1    1/2003  Shahar et al.

FOREIGN PATENT DOCUMENTS

EP    0 702 473 A1    3/1996

OTHER PUBLICATIONS

P. A. Foriel et al, "Connection-based multiplexers: an alternative for traffic shaping in ATM networks", IEEE ATM Workshop 1997. Proceedings Lisboa, Portugal May 25-28, 1997, NY, NY, IEEE, pp. 233-240, XP010247408.

* cited by examiner

*Primary Examiner*—Wing F. Chan
*Assistant Examiner*—Gregory B Sefcheck
(74) *Attorney, Agent, or Firm*—Sughrue Mion, PLLC

(57) ABSTRACT

The present invention relates to a scheduling unit adapted to aggregate data units from a plurality of input ports to a common output port according to a service sequence. The service sequence identifies which particular input port must be served for a particular service slot.

Figure 1:
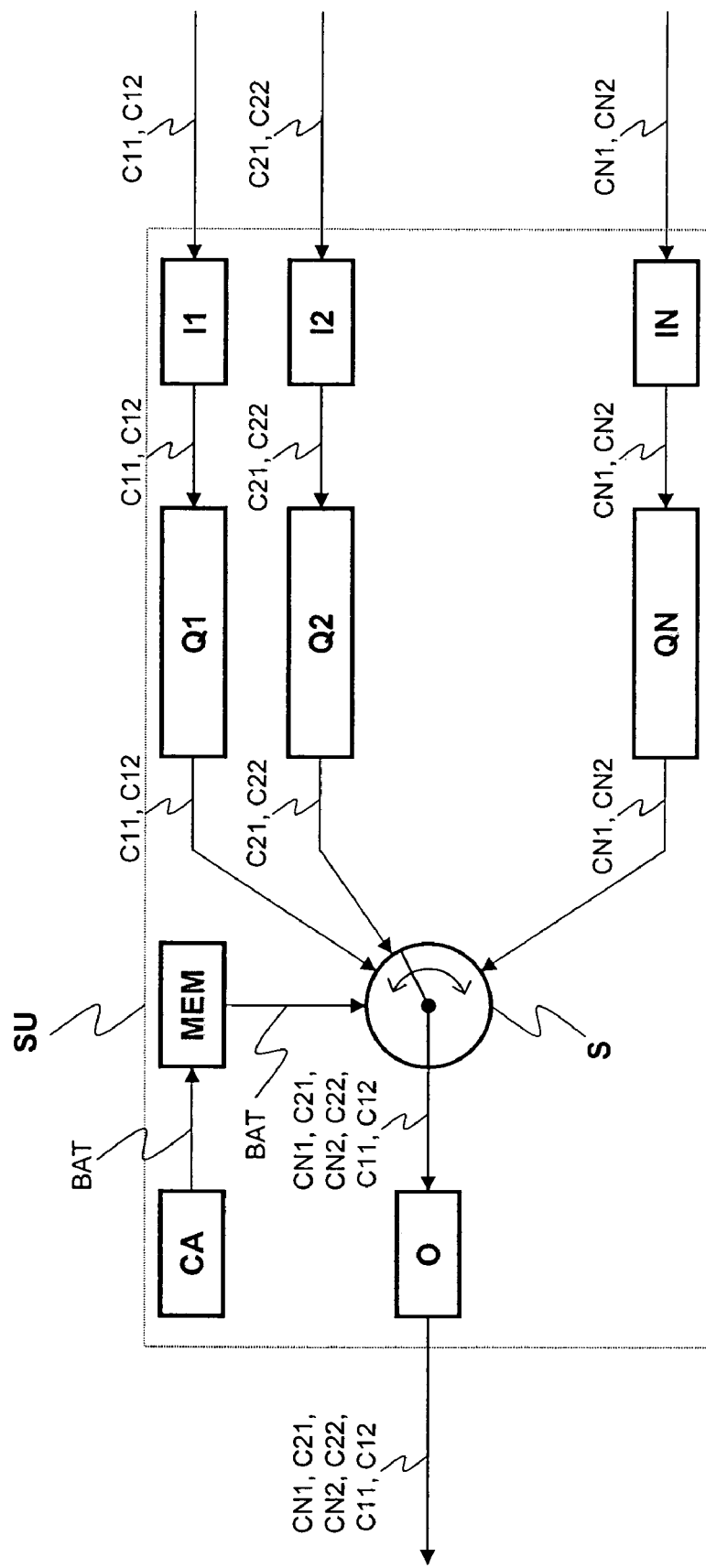

A scheduling unit according to the present invention features optimized jitter and queue occupancy figures. This is achieved by allotting a number of service slots to each input port in proportion to its service share, next by determining for each input port a corresponding number of candidate positions uniformly spaced over the service sequence, finally by resolving any contention between the so-determined candidate positions. A service slot is assigned first and foremost to the input port which has the highest number of candidate positions considered while determining the service sequence yet not assigned to any service slot, next which gets the highest service share.

4 Claims, 4 Drawing Sheets

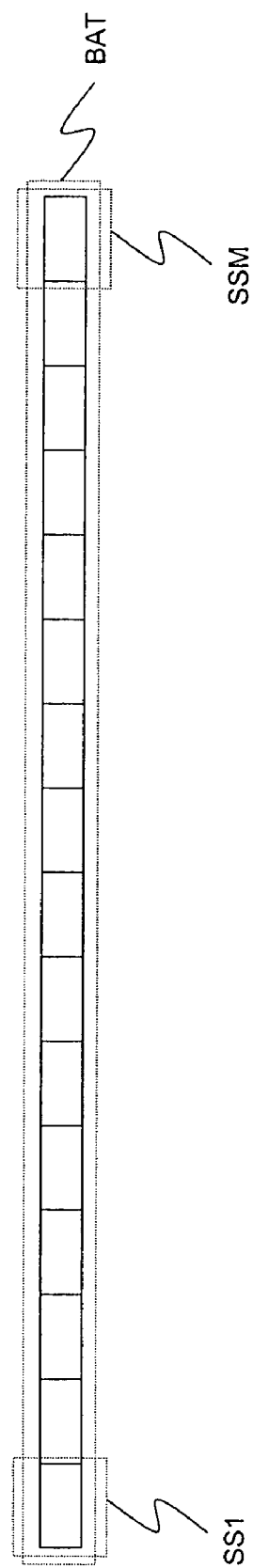
Figure 3.1
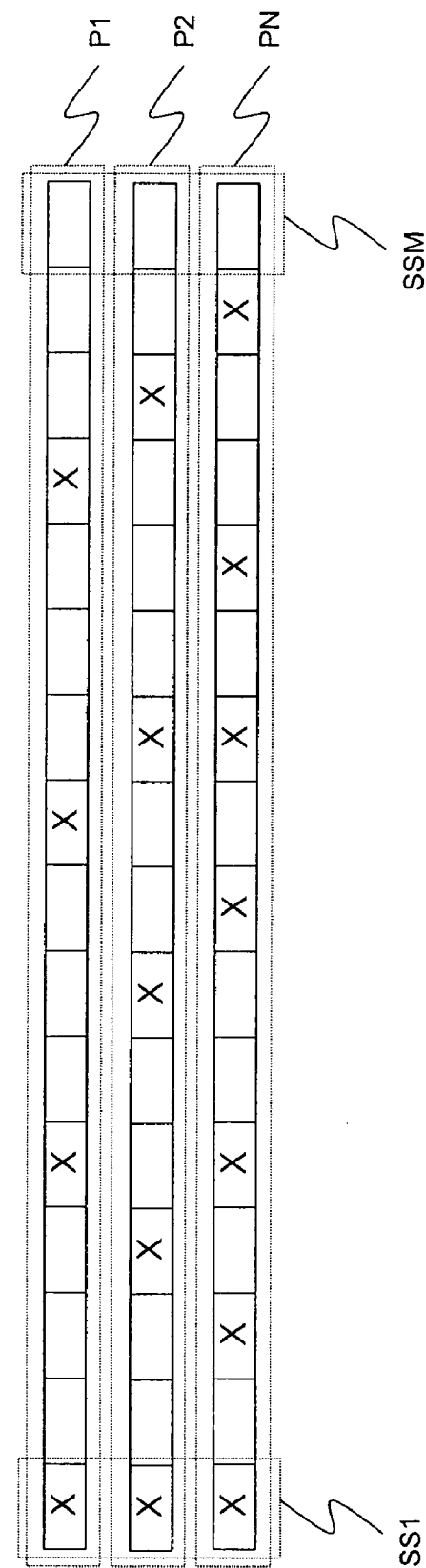
Figure 3.2

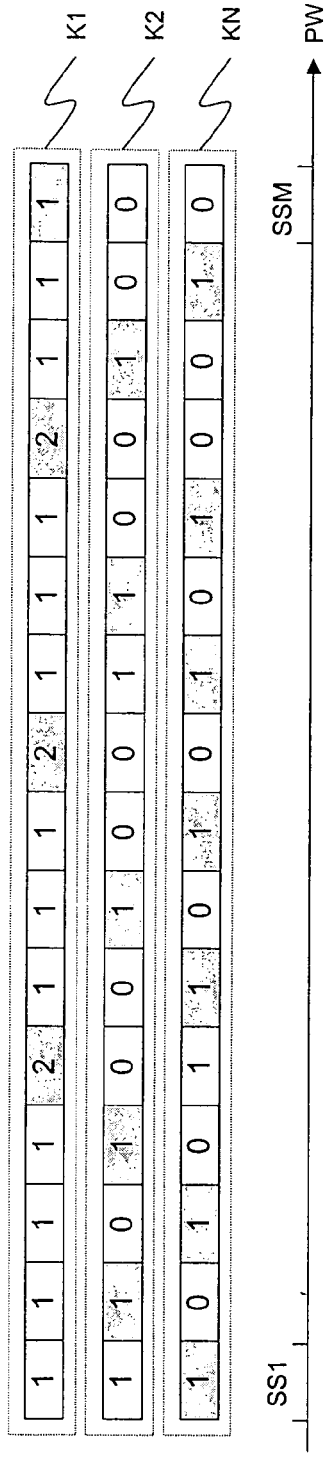
Figure 4.1
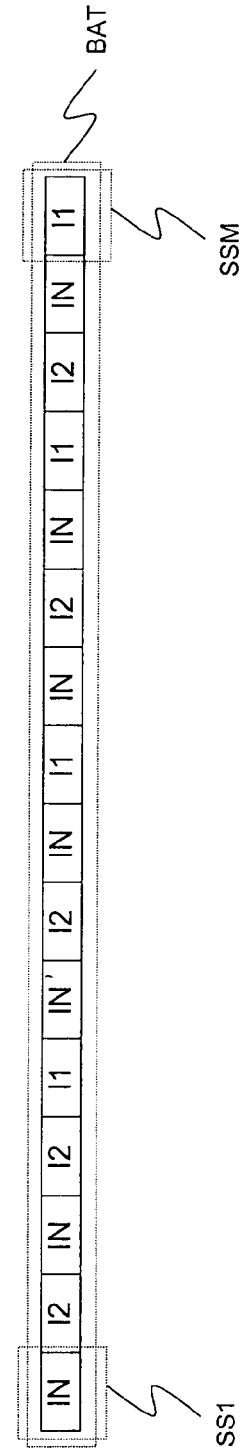
Figure 4.2

SCHEDULING UNIT WITH OPTIMIZED JITTER AND QUEUE OCCUPANCY

The present invention relates to a scheduling unit comprising:
- a plurality of input ports adapted to receive data units,
- an output port adapted to transmit said data units,
- a plurality of first-in first-out queues coupled to respective ones of said plurality of input ports, and adapted to backlog said data units,
- a storage means adapted to hold a service sequence comprising a plurality of service slots,
- a scheduler coupled to said plurality of first-in first-out queues, to said output port and to said storage means, and adapted to schedule according to said service sequence said data units from said plurality of first-in first-out queues for transmission onto said output port,
- a configuration agent coupled to said storage means, and adapted to determine said service sequence, said configuration agent comprising.
- a first agent adapted to allot a number of service slots to each of said plurality of input ports,
- a second agent coupled to said first agent, and adapted to determine, for each of said plurality of input ports, a corresponding number of candidate positions uniformly spaced over said service sequence.

Such a scheduling unit is already known in the art, from the article entitled '*Connection-Based Multiplexer: An Alternative for Traffic Shaping in ATM Networks*' from Pierre-Andre FORIEL and Aline FICHOU, published in the course of the IEEE ATM '97 workshop.

The disclosed scheduling unit makes use of a calendar concept. A calendar—further referred to as a service sequence—is composed of a limited number of entries—further referred to as service slots—. A service slot stands for a unit of service, e.g. the transmission of one ATM cell. The service sequence is read through by the scheduler to determine which particular input queue must be served for a particular service slot. Each input port is allotted a number of service slots in proportion to its service share.

Several ways of filling up the service sequence have been described in the literature.

In the disclosed scheduling unit, the placement is achieved without re-organizing the service slots that are previously assigned to existing virtual circuits. The algorithm minimizes the Cell Delay Variation (CDV)—or jitter—tolerance, and is based on pseudo-correlation and weight computation while mapping an ideally spaced flow onto the service sequence.

A deficiency of the disclosed scheduling unit is that the jitter is the less optimized as the service sequence is the more filled: earlier connections gets a better jitter than subsequent ones, although delay requirements may be more stringent for the latters.

Another deficiency of the disclosed scheduling unit is that the order of service is not deterministic, rather closely depends on the connection chronology. It therefore complicates the buffer dimensioning in the forthcoming systems or components.

Another deficiency of the disclosed scheduling unit is the relatively high complexity of the algorithm, which may be time consuming for systems with low/medium processing capabilities, e.g. embedded systems.

It is an object of the present invention to palliate the foregoing deficiencies.

According to the invention, this object is achieved due to the fact that said configuration agent further comprises:
- a third agent coupled to said second agent, and adapted to count, for each of said plurality of input ports, the number of candidate positions considered while determining said service sequence yet not assigned to any service slot,
- a fourth agent coupled to said first agent, to said third agent and to said storage means, and adapted to assign a service slot out of said plurality of service slots to an input port out of said plurality of input ports, which has the highest number of candidate positions considered while determining said service sequence yet not assigned to any service slot, next which gets the highest number of service slots allotted by said first agent.

The problem of optimally configuring the service sequence appears to be similar to the worst case traffic condition, namely when all the input ports receive simultaneously data units at their nominal rate. In such a situation, the input port with the largest number of pending data units should ideally be serviced first.

A scheduling unit according to the present invention features optimized jitter and queue occupancy figures for each and every cell flow, irrespective of the connection chronology, with the trade-off of re-organizing the whole service sequence whenever a new connection is established.

The latter shortcoming may be alleviated by computing in background the new service sequence and by pushing the new service sequence in said storage means, thus reducing the service outage.

The present invention is not restricted to ATM technology, but is applicable to whatever type of data units, with the constraint that the data units have a fixed length.

It is to be noticed that an input port and an output port stand for hardware and/or software components, from which data units are received and to which data units are forwarded respectively, being an internal API, an internal physical port, a logical partition thereof, an external physical port, a logical partition thereof, etc.

It is to be noticed that an input port or an output port may interface to whatever type of physical medium, being chip/board trails, wires, coaxial cables, optical fibers, wave guides, the atmosphere, or an empty space.

Another characterizing embodiment of the present invention is that said configuration agent is further adapted to determine said service sequence in a chronological order.

By so doing, the service sequence is deterministic.

One may consider other predictable programming sequences, such as the reverse chronological order, a predetermined mathematical sequence with the service slot identifier as an input, etc.

Further characterizing embodiments of the present invention are mentioned in the appended claims.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

Figure 2:
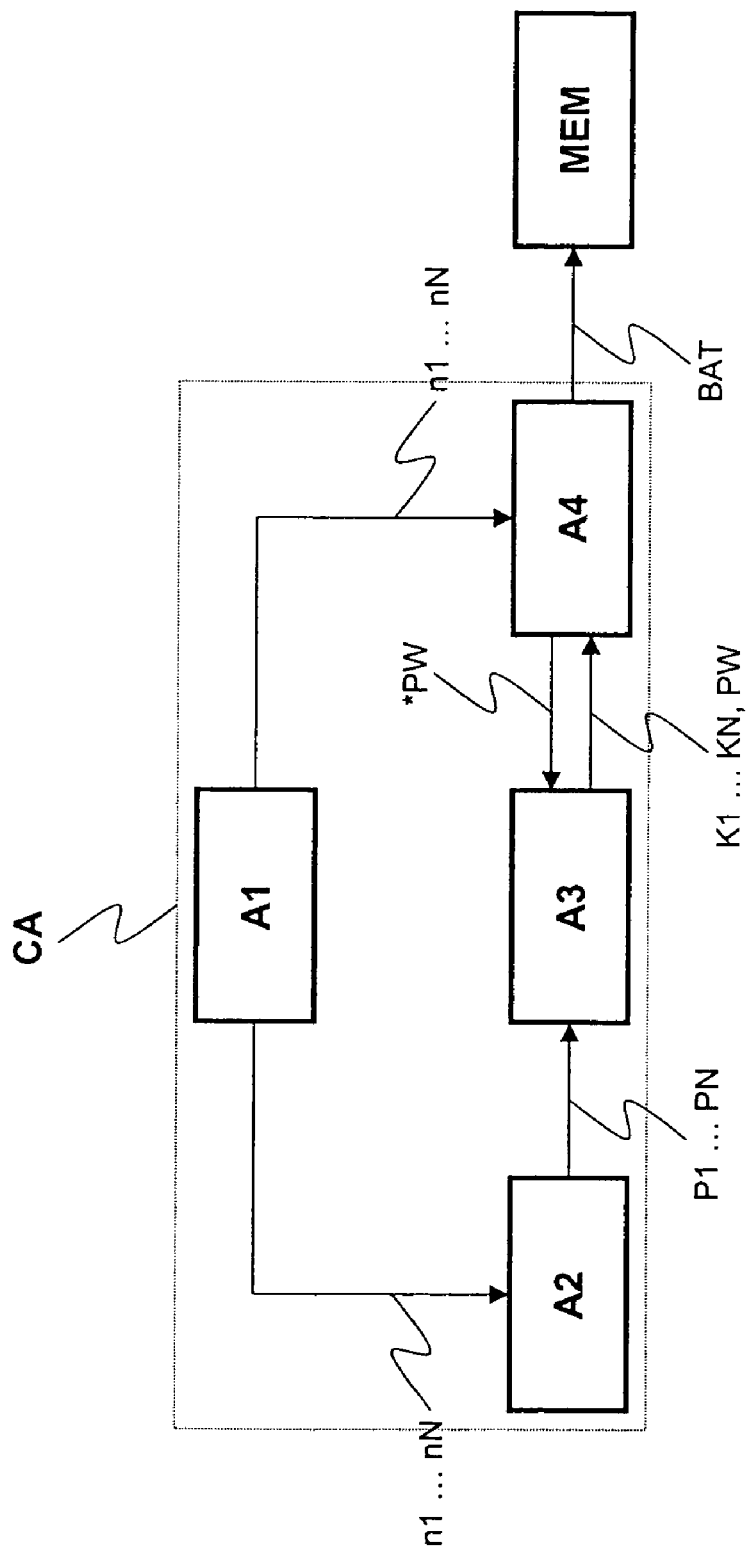

The above and other objects and features of the invention will become more apparent and the invention itself will be best understood by referring to the following description of an embodiment taken in conjunction with the accompanying drawings wherein:

FIG. 1 represents a scheduling unit according to the invention,

FIG. 2 represents with further details a configuration agent of the scheduling unit, FIG. 3.1 represents the structure of a service sequence, FIG. 3.2 represents, for each of the considered input ports, candidate positions over the service sequence, FIG. 4.1 represents a chronology of the necessary counters maintained for resolving any contention between the candidate positions, FIG. 4.2 represents the final service sequence as being set up according to the present invention.

FIG. 1 depicts a scheduling unit SU adapted to aggregate ATM cells from a plurality of input ports to a common output port.

With respect to the present invention, the scheduling unit SU comprises the following functional blocks:
N input ports I1 to IN,
an output port O,
N first-in first-out queues Q1 to QN,
a storage means MEM,
a scheduler S,
a configuration agent CA.

The input ports I1 to IN are coupled to respective ones of the first-in first-out queues Q1 to QN. The first-in first-out queues Q1 to QN are coupled to the scheduler S. The scheduler S is coupled to both the storage means MEM and the output port O. The configuration agent CA is coupled to the storage means MEM.

The input ports I1 to IN accommodate the necessary means for receiving and decoding ATM cells conveyed over a physical medium, such as an optical fiber. C11, C12, C21, C22, CN1 and CN2 are depicted as instances of ATM cells.

The output port O accommodates the necessary means for encoding and transmitting ATM cells over a physical medium. ATM cells are sequentially received from the scheduler S.

The first-in first-out queues Q1 to QN accommodate the necessary means for storing the incoming ATM cells, and for delivering them in the chronological receipt order.

The storage means MEM is adapted to hold a service sequence BAT, an instance of which being depicted in FIG. 3.1. The service sequence BAT comprises M service slot SS1 to SSM. Each service slot holds an identifier identifying one or none of the input ports I1 to IN.

The scheduler S is adapted to:
determine from the current entry of the service sequence BAT which one of the first-in first-out queues Q1 to QN is to be served,
retrieve one ATM cell from the corresponding queue,
schedule this cell for transmission onto the output port O.

If the scheduled queue is empty, then the scheduler S may transmit an idle ATM cell (non work conservative scheduler), or may jump immediately to the next service slot (work conservative scheduler).

The configuration agent CA is adapted to initialize and update the service sequence BAT according to the present invention.

To carry out this task, the configuration agent CA comprises the following functional blocks (see FIG. 2):
a first agent A1,
a second agent A2,
a third agent A3,
a fourth agent A4.

The first agent A1 is coupled to both the second agent A2 and the fourth agent A4. The third agent A3 is coupled to both the second agent A2 and the fourth agent A4. The fourth agent A4 is coupled to the storage means MEM.

The first agent A1 is adapted to allot a number of service slots to each input port in proportion to its service share, thereby determining N numbers n1 to nN for respective ones of the input ports I1 to IN.

This is achieved by first multiplying the total number of service slots M by the corresponding service share, next by rounding up or down the obtained figure, with the constraint that $$\sum_{i=n}^{N} ni \le M.$$

The so-determined numbers n1 to nN are made available to both the second agent A2 and the fourth agent A4, e.g. by means of a shared memory area and a software trigger, or by means of a public/friendly method returning any of the numbers n1 to nN.

The second agent A2 is adapted to determine for each input port a corresponding number of candidate positions uniformly spaced over the service sequence BAT, thereby determining N initial placements P1 to PN for respective ones of the input ports I1 to IN.

This is achieved by computing the ideal cell spacing for each input port, next by mapping this ideal cell spacing onto the service sequence granularity, so as to reduce the induced jitter as low as possible.

The so-determined initial placements P1 to PN are made available to the third agent A3.

The third agent A3 and the fourth agent A4 determine both together the service sequence BAT from the initial placements P1 to PN.

The service sequence BAT is filled in a pre-determined order. A write pointer PW points to the service slot that is currently considered for assignment. In the preferred embodiment of the present invention, the write pointer PW scans the service sequence BAT in the chronological order, that is to say from SS1 to SSN.

The third agent A3 is adapted to count for each input port the number of candidate positions considered while determining the service sequence BAT yet not assigned to any service slot.

This is achieved by maintaining N counters K1 to KN for respective ones of the input ports I1 to IN. A counter is incremented whenever the corresponding input port is candidate for the currently considered service slot, that is to say the service slot pointed by the pointer PW. A counter is decremented whenever the corresponding input port is assigned the currently considered service slot. The counters K1 to KN abstract the number of data units which would be queued, assuming an ideally spaced incoming flow at its nominal rate.

In the preferred embodiment, the write pointer PW is maintained by the third agent A3. Other embodiment may be thought off, such as the fourth agent A4 or a third-party software component maintaining the write pointer PW.

The writer PW, together with the counters K1 to KN, are made available to the fourth agent A4.

The fourth agent A4 is adapted to assign the currently considered service slot to a particular input port.

The selection criteria are the following in precedence order:
- select the input port which has the highest number of candidate positions considered while determining the service sequence yet not assigned to any service slot, that is to say select the input port, the counter of which has the highest value,
- select the input port which gets the highest number of service slots allotted by the first agent A1, that is to say select the input port with the highest service share,
- select the input port with the lowest port number.

The identity of the input port *PW as selected by the fourth agent A4 is made available to the third agent A3, for it to decrement the corresponding counter.

An operation of the scheduling unit SU is described hereafter.

3 input ports I1, I2 and IN are assumed to share the whole service, with 25%, 33% and 42% as service share respectively.

Therefrom, the first agent A1 determines the number of service slots the input ports I1, I2 and IN are allotted respectively.

For instance and assuming M=16:

$$n1=\lfloor 0.25 \times M \rfloor = \lfloor 4 \rfloor = 4$$

$$n2=\lfloor 0.33 \times M \rfloor = \lfloor 5.28 \rfloor = 5$$

$$nN=\lceil 0.42 \times M \rceil = \lceil 6.72 \rceil = 7$$

The second agent A2 determines an initial placement for each of the input ports I1, I2 and IN.

The second agent A2 first computes the ideal cell spacing for each input port, next maps this ideal cell spacing onto the service sequence granularity.

For instance and referring to FIG. 3.2, the initial placement P1 for the input port I1 comprises the following candidate positions: SS1, SS5, SS9 and SS13, the initial placement P2 for the input port I2 comprises the following candidate positions: SS1, SS4, SS7, SS10 and SS14, and the initial placement PN for the input port IN comprises the following candidate positions: SS1, SS3, SS5, SS8, SS10, SS12 and SS15.

One may consider other initial placements that get roughly the same average jitter, e.g. one may start from another position in the service sequence, or one may approximate the ideal cell spacing by another pattern.

The third agent A3 initializes the write pointer PW to SS1, and resets the counters K1 to KN to zero.

The third agent A3 determines which one out of the input ports I1 to IN was initially mapped onto SS1 by the second agent A2. The third agent A3 identifies the input ports I1, I2 and IN. The third agent A3 increments the counters K1, K2 and KN accordingly, i.e. the input ports I1, I2 and IN have 1 candidate position considered yet not assigned to any services slot.

The fourth agent A4 assigns the service slot SS1 to the input port IN, on account of its highest service share (K1=K2=KN=1 but nN=7>n1=4, n2=5). The identity of the input port IN is written at the memory location pointed by PW and returned back to the third agent A3.

The third agent A3 decrements KN accordingly. Next, the third agent A3 increments PW to SS2.

The third agent A3 determines which one out of the input ports I1 to IN was initially mapped onto SS2. The third agent A3 does not identify any input port. Consequently, the counters K1, K2 and KN are left unchanged.

The fourth agent A4 assigns the service slot SS2 to the input port I2, on account of its highest service share (K1=K2=1>KN=0 but n2=5>n1=4).

The third agent A3 decrements K2 accordingly. Next, the third agent A3 increments PW to SS3.

The third agent A3 determines which one out of the input ports I1 to IN was initially mapped onto SS3. The third agent A3 identifies the input port IN. The third agent A3 increments the counters KN accordingly.

The fourth agent A4 assigns the service slot SS3 to the input port IN, on account of its highest service share (K1=KN=1>K2=0 but nN=7>n1=4).

The third agent A3 decrements KN accordingly. Next, the third agent A3 increments PW to SS4.

The third agent A3 determines which one out of the input ports I1 to IN was initially mapped onto SS4. The third agent A3 identifies the input port I2. The third agent A3 increments the counters K2 accordingly.

The fourth agent A4 assigns the service slot SS4 to the input port I2, on account of its highest service share (K1=K2=1>KN=0 but n2=5>n1=4).

The third agent A3 decrements K2 accordingly. Next, the third agent A3 increments PW to SS5.

The third agent A3 determines which one out of the input ports I1 to IN was initially mapped onto SS5. The third agent A3 identifies the input port I1 and IN. The third agent A3 increments the counters K1 and KN accordingly.

The fourth agent A4 assigns the service slot SS5 to the input port I1, on account of its highest counter value (K1=2>KN=1, K2=0).

The third agent A3 decrements K1 accordingly. Next, the third agent A3 increments PW to SS6.

The process keeps on until the end of the service sequence is reached, i.e. until PW=SSN.

FIG. 4.1 shows the chronology of the counters K1, K2 and KN versus the value of the write pointer PW. The selected input port is gray shadowed.

FIG. 4.2 shows the so-obtained service sequence.

In an alternative embodiment of the present invention (not shown), the third agent A3 makes use of a distinct storage area while determining a new service sequence, that is to say the pointer PW does not point towards the service sequence BAT as used by the scheduler S, but towards a temporary data structure. Next, the new service sequence is made available to the scheduler S by pushing it into the storage means MEM.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:
1. A cell scheduling unit (SU) comprising:
a plurality of input ports (I1 to IN) adapted to receive data units (C11, C12, C21, C22, CN1, CN2),
an output port (O) adapted to transmit said data units,
a plurality of first-in first-out queues (Q1 to QN) coupled to respective ones of said plurality of input ports, and adapted to backlog said data units, a storage means (MEM) adapted to hold a service sequence (BAT) comprising a plurality of service slots (SS1 to SSM), a scheduler (S) coupled to said plurality of first-in first-out queues, to said output port and to said storage means, and adapted to schedule according to said service sequence said data units from said plurality of first-in first-out queues for transmission onto said output port, a configuration agent (CA) coupled to said storage means, and adapted to determine said service sequence, said configuration agent comprising:

a first agent (A1) adapted to allot a number of service slots (n1 to nN) to each of said plurality of input ports, a second agent (A2) coupled to said first agent, and adapted to determine, for each of said plurality of input ports, a corresponding number of candidate positions uniformly spaced over said service sequence (P1 to PN), characterized in that said configuration agent further comprises:

a third agent (A3) coupled to said second agent, and adapted to count, for each of said plurality of input ports, the number of candidate positions considered while determining said service sequence which has not yet been assigned to any service slot, a fourth agent (A4) coupled to said first agent, to said third agent and to said storage means, and adapted to assign a service slot out of said plurality of service slots to an input port out of said plurality of input ports, based on an order which has the highest number of candidate positions considered while determining said service sequence which has not yet been assigned to any service slot, and subsequently is based on which gets the highest number of service slots allotted by said first agent.

2. A cell scheduling unit according to claim 1, characterized in that said configuration agent is further adapted to determine said service sequence in a chronological order (from SS1 to SSM).

3. An ATM cell switching unit comprising at least one cell scheduling unit according to claim 1.

4. An ATM cell multiplexing unit comprising at least one cell scheduling unit according to claim 1.

* * * * *